United States Patent
Murase

(10) Patent No.: US 11,685,822 B2
(45) Date of Patent: Jun. 27, 2023

(54) RUBBER COMPOSITION FOR A TIRE TREAD

(71) Applicant: The Yokohama Rubber Co., LTD., Tokyo (JP)

(72) Inventor: Keisuke Murase, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 845 days.

(21) Appl. No.: 16/087,066

(22) PCT Filed: Mar. 23, 2017

(86) PCT No.: PCT/JP2017/011804
§ 371 (c)(1),
(2) Date: Sep. 20, 2018

(87) PCT Pub. No.: WO2017/164329
PCT Pub. Date: Sep. 28, 2017

(65) Prior Publication Data
US 2021/0198458 A1 Jul. 1, 2021

(30) Foreign Application Priority Data
Mar. 25, 2016 (JP) .............................. JP2016-062444

(51) Int. Cl.
*C08L 9/06* (2006.01)
*B60C 1/00* (2006.01)
*C08L 7/00* (2006.01)

(52) U.S. Cl.
CPC .............. *C08L 9/06* (2013.01); *B60C 1/0016* (2013.01); *C08L 7/00* (2013.01); *C08L 2205/025* (2013.01); *C08L 2205/035* (2013.01)

(58) Field of Classification Search
CPC ................. C08L 9/06; C08L 2205/035; C08L 2205/025; C08L 7/00; B60C 1/0016
(Continued)

(56) References Cited

U.S. PATENT DOCUMENTS 4,786,677 A * 11/1988 Nakai ...................... C08K 3/04
524/496
4,929,679 A * 5/1990 Akita ....................... C08L 9/06
152/905

(Continued)

FOREIGN PATENT DOCUMENTS

JP 2009-001176 1/2009
JP 2015-000971 1/2015

(Continued)

OTHER PUBLICATIONS

International Search Report for International Application No. PCT/JP2017/011804 dated Jun. 13, 2017, 4 pages, Japan.

*Primary Examiner* — Doris L Lee
(74) *Attorney, Agent, or Firm* — Thorpe North & Western

(57) ABSTRACT

Provided is a rubber composition including: per 100 parts by mass of a diene rubber containing a natural rubber and from 10 to 30 mass % of a butadiene rubber, from 50 to 100 parts by mass of a filler containing not less than 20 mass % of carbon black, oil, sulfur (S), and a vulcanization accelerator (A), a mass ratio of the natural rubber to the butadiene rubber (NR/BR) being 0.3 or greater, a compounded ratio of the sulfur to the vulcanization accelerator (S/A) being 0.8 or less, and a total amount of an oil component in the rubber composition containing the oil being from 15 to 25 parts by mass.

2 Claims, 1 Drawing Sheet

(58) Field of Classification Search
USPC .......................................................... 524/526
See application file for complete search history.

(56) References Cited

U.S. PATENT DOCUMENTS

| | | | | |
|---|---|---|---|---|
| 8,440,757 B2 * | 5/2013 | Kushida | ................... | C08L 9/00 |
| | | | | 524/492 |
| 2007/0037915 A1 * | 2/2007 | Masumoto | ............. | C08K 5/548 |
| | | | | 524/492 |
| 2009/0137718 A1 * | 5/2009 | Hirabayashi | .............. | C08L 7/00 |
| | | | | 524/496 |
| 2013/0048179 A1 * | 2/2013 | Muller | ................ | B60C 11/0041 |
| | | | | 152/450 |
| 2013/0331498 A1 * | 12/2013 | Miyazaki | ................... | C08L 9/00 |
| | | | | 524/493 |
| 2015/0031791 A1 * | 1/2015 | Sugiura | ................ | B60C 1/0016 |
| | | | | 523/156 |
| 2015/0080493 A1 * | 3/2015 | Kamada | .................... | C08L 9/00 |
| | | | | 523/156 |
| 2016/0108214 A1 * | 4/2016 | Tokimune | ............... | C08L 21/00 |
| | | | | 524/418 |
| 2017/0137615 A1 | 5/2017 | Nakajima | | |
| 2017/0174001 A1 | 6/2017 | Miyazaki et al. | | |

FOREIGN PATENT DOCUMENTS

| | | |
|---|---|---|
| JP | 2015-101636 | 6/2015 |
| JP | 2015-124370 | 7/2015 |
| JP | 2015-196825 | 11/2015 |
| JP | 2015-229701 | 12/2015 |
| WO | WO 2014/203666 * | 12/2004 |
| WO | WO 2013/040425 * | 3/2013 |
| WO | WO 2014/203666 | 12/2014 |
| WO | WO 2016/002506 | 1/2016 |

* cited by examiner

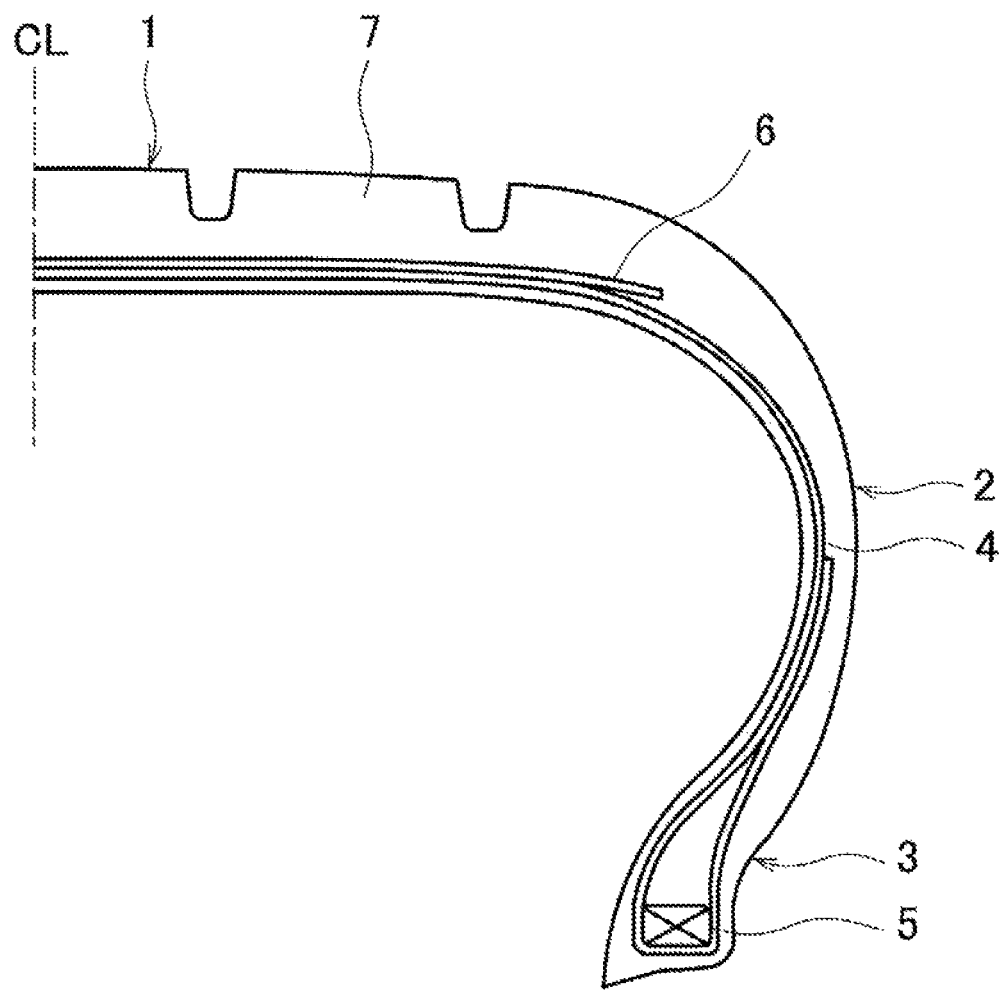

RUBBER COMPOSITION FOR A TIRE TREAD

TECHNICAL FIELD

The present technology relates to a rubber composition for a tire tread that further enhances the balance of performance on snow and chipping resistance.

BACKGROUND ART

For pneumatic tires for use on icy and snowy roads (studless tire), excellent performance on snow during traveling on snow-covered road surfaces is required. To enhance the performance on snow, flexibility in a low temperature condition is typically ensured by blending a butadiene rubber and/or an aroma oil into a rubber composition for a tire tread. However, when a large amount of butadiene rubber and/or aroma oil is blended, a problem of chipping tends to occur in a tire tread.

Japan Unexamined Patent Publication No. 2015-229701 proposes to enhance performance on snow, wet performance, and wear resistance by a rubber composition containing a terminal-modified styrene-butadiene rubber, a natural rubber, a butadiene rubber, silica, and carbon black. However, consumers have even higher expectation of enhancing chipping resistance as well as performance on snow, and there are demands for further enhancing these characteristics.

SUMMARY

The present technology provides a rubber composition for a tire tread by which the balance of performance on snow and chipping resistance is enhanced equal to or beyond levels in the related art.

The rubber composition for a tire tread of an embodiment of the present technology that achieves the object described above is a rubber composition containing: per 100 parts by mass of a diene rubber containing a natural rubber and from 10 to 30 mass % of a butadiene rubber, from 50 to 100 parts by mass of a filler containing not less than 20 mass % of carbon black, S parts by mass of sulfur, A parts by mass of a vulcanization accelerator, and oil, a mass ratio of the natural rubber to the butadiene rubber (NR/BR) being 0.3 or greater, a compounded ratio of the sulfur to the vulcanization accelerator (S/A) being 0.8 or less, and a total amount of an oil component in the rubber composition containing the oil being from 15 to 25 parts by mass.

Because the rubber composition for a tire tread of an embodiment of the present technology contains: 100 parts by mass of a diene rubber containing a natural rubber and from 10 to 30 mass % of a butadiene rubber in a mass ratio of the natural rubber to the butadiene rubber (NR/BR) of 0.3 or greater, 50 to 100 parts by mass of a filler containing not less than 20 mass % of carbon black, and oil so that a total amount of an oil component in the rubber composition is from 15 to 25 parts by mass, and a mass ratio of the sulfur (S) to the vulcanization accelerator (A) (S/A) is 0.8 or less, performance on snow and chipping resistance can be enhanced equal to or beyond levels in the related art.

In an embodiment of the present technology, the diene rubber further contains an emulsion-polymerized styrene-butadiene rubber and/or a solution-polymerized styrene-butadiene rubber, and a styrene content of the styrene-butadiene rubber is preferably less than 40 mass %.

The pneumatic tire for a passenger vehicle that uses the rubber composition of an embodiment of the present technology in a tread portion can enhance the performance on snow and the chipping resistance equal to or beyond levels in the related art.

BRIEF DESCRIPTION OF DRAWINGS

FIG. 1 is a cross-sectional view in a tire meridian direction that illustrates an example of an embodiment of a pneumatic tire in which a tire rubber composition according to an embodiment of the present technology is used.

DETAILED DESCRIPTION

A pneumatic tire illustrated in FIG. 1 includes a tread portion 1, a sidewall portion 2, and a bead portion 3. A carcass layer 4 is mounted between the left and right bead portions 3 and 3, and each end of the carcass layer 4 is folded over from the inside to the outside of the tire around a bead core 5. A belt layer 6 is disposed on the outer side in the tire radial direction of the carcass layer 4 in the tread portion 1, and a tread rubber 7 is disposed on the outside of the belt layer 6. The rubber composition for a tire tread of an embodiment of the present technology can be suitably used in the tread rubber 7.

In the rubber composition for a tire tread of an embodiment of the present technology, the rubber component is a diene rubber, and the diene rubber necessarily contains a butadiene rubber and a natural rubber. Containing the butadiene rubber can ensure the performance on snow while maintaining the flexibility of the rubber composition at low temperatures. Furthermore, containing the natural rubber can enhance the chipping resistance.

In an embodiment of the present technology, the content of the butadiene rubber is from 10 to 30 mass %, and preferably from 15 to 30 mass %, per 100 mass % of the diene rubber. When the compounded amount of the butadiene rubber is less than 10 mass %, the performance on snow is deteriorated. Furthermore, when the compounded amount of the butadiene rubber is greater than 30 mass %, the chipping resistance is deteriorated. Any butadiene rubber that is regularly used in rubber compositions for tire treads is suitably used.

The rubber composition for a tire tread can enhance the chipping resistance while the performance on snow is maintained at a high level by allowing the natural rubber to be contained. Any natural rubber that is regularly used in rubber compositions for tire treads is suitably used. For the content of the natural rubber, the mass ratio of the content of the natural rubber to the content of the butadiene rubber (NR/BR) is 0.3 or greater, preferably 0.4 or greater, or more preferably 0.5 or greater. Furthermore, the mass ratio of the content of the natural rubber to the content of the butadiene rubber (NR/BR) is preferably 4.5 or less, more preferably 2.5 or less, and even more preferably less than 1.0. When the mass ratio of the content of the natural rubber to the content of the butadiene rubber (NR/BR) is less than 0.3, the chipping resistance is deteriorated.

In an embodiment of the present technology, the diene rubber may contain another diene rubber besides the butadiene rubber and the natural rubber. Examples of another diene rubbers include isoprene rubber, styrene-butadiene rubber, butyl rubber, halogenated butyl rubber, and the like. A single diene rubber may be contained or a blend of multiple diene rubbers may be contained as such another diene rubber.

Such another diene rubber is preferably a styrene-butadiene rubber. Containing the styrene-butadiene rubber can enhance the chipping resistance while ensuring the performance on snow. As the styrene-butadiene rubber, an emulsion-polymerized styrene-butadiene rubber and a solution-polymerized styrene-butadiene rubber are preferable, and a single type or a blend of multiple types thereof can be contained. A plurality of styrene-butadiene rubbers is more preferably contained, and the balance of the performance on snow and the chipping resistance can be further enhanced.

The styrene-butadiene rubber that is suitably used in an embodiment of the present technology contains a styrene content of preferably less than 40 mass %, and more preferably 38 mass % or less. Furthermore, the styrene content is preferably 22 mass % or greater, and more preferably 24 mass % or greater. By setting the styrene content of the styrene-butadiene rubber to the range, the chipping resistance when a pneumatic tire is formed can be further enhanced. Note that the styrene unit content of the styrene-butadiene rubber is measured by infrared spectroscopy (Hampton method).

In an embodiment of the present technology, the content of the styrene-butadiene rubber is preferably 87 mass % or less, more preferably from 30 to 80 mass %, and even more preferably from 40 to 70 mass %, per 100 mass % of the diene rubber. When the content of the styrene-butadiene rubber is greater than 87 mass % in the diene rubber, the chipping resistance may be deteriorated.

In the rubber composition for a tire tread, the total amount of the oil components is from 15 to 25 parts by mass, and preferably from 16 to 24 parts by mass, per 100 parts by mass of the diene rubber. When the total amount of the oil components is less than 15 parts by mass, the performance on snow is deteriorated. When the total amount of the oil components is greater than 25 parts by mass, the chipping resistance is deteriorated. Note that the total amount of the oil components refers to the total amount that is contained in the rubber composition and includes extender oil in the diene rubber and oil(s) added during preparation of the rubber composition. Furthermore, examples of the oil to be added during the preparation of the rubber composition include natural oils, synthetic oils, plasticizers, and the like.

The rubber composition for a tire tread of an embodiment of the present technology contains sulfur and a vulcanization accelerator. When, per 100 parts by mass of the diene rubber, the compounded amount of the sulfur is S parts by mass and the compounded amount of the vulcanization accelerator is A parts by mass, the compounded ratio of the sulfur to the vulcanization accelerator (S/A) is 0.8 or less, and preferably 0.78 or less. By setting the compounded ratio (S/A) of the sulfur to the vulcanization accelerator to 0.8 or less, excellent chipping resistance can be achieved. Note that the compounded amount, S parts by mass, of the sulfur is a net amount of the sulfur that is blended for vulcanization. When one or more types of vulcanization accelerators are compounded, the compounded amount, A parts by mass, of the vulcanization accelerator is the total amount of these.

The rubber composition for a tire tread of an embodiment of the present technology contains from 50 to 100 parts by mass of a filler containing 20 mass % or greater of carbon black, per 100 parts by mass of the diene rubber. By setting the compounded amount of the filler to the range, the performance on snow and the chipping resistance of the rubber composition can be balanced at a higher level. When the compounded amount of the filler is less than 50 parts by mass, a high level of chipping resistance cannot be ensured. When the compounded amount of the filler is greater than 100 parts by mass, the performance on snow is deteriorated.

The content of the carbon black is 20 mass % or greater, and preferably from 20 to 60 mass %, per 100 mass % of the filler. By setting the content of the carbon black in the filler to the range, good performance on snow and chipping resistance of the rubber composition can be provided in a compatible manner.

As the carbon black, any carbon black that is regularly used in rubber compositions for tire treads can be blended. The nitrogen adsorption specific surface area ($N_2SA$) of the carbon black is preferably from 110 to 180 $m^2/g$, and more preferably from 130 to 160 $m^2/g$. In the present specification, the nitrogen adsorption specific surface area is measured in accordance with JIS (Japanese Industrial Standard) K 6217-2.

The rubber composition for a tire tread of an embodiment of the present technology may also include other fillers than carbon black. Examples of other fillers except the carbon black include silica, clay, mica, talc, calcium carbonate, aluminum hydroxide, aluminum oxide, titanium oxide, and the like. Among these, silica is preferable. Containing such another filler together with the carbon black can enhance rubber strength. The content of such another filler is 80 mass % or less, and preferably from 40 to 80 mass %, per 100 mass % of the fillers. When the content of such another filler is greater than 80 mass %, the chipping resistance is deteriorated.

The silica may be any silica that is regularly used in rubber compositions for tire treads. Examples thereof include wet method silica, dry method silica, surface treated silica, and the like. The particle properties of the silica is not particularly limited; however, preferably, the CTAB (cetyltrimethylammonium bromide) specific surface area is preferably from 120 to 200 $m^2/g$, and more preferably from 140 to 180 $m^2/g$. In the present specification, the CTAB specific surface area is measured in accordance with JIS K 6430 Appendix G.

In the rubber composition of an embodiment of the present technology, a silane coupling agent is preferably compounded together with the silica, and this enables enhancement of the dispersibility of the silica and makes the reinforcing properties for the diene rubber even higher. The compounded amount of the silane coupling agent is preferably from 3 to 20 mass %, and more preferably from 5 to 15 mass %, relative to the compounded amount of the silica. When the compounded amount of the silane coupling agent is less than 3 mass % of the mass of the silica, effect of enhancing dispersion of the silica cannot be sufficiently achieved. Furthermore, when the compounded amount of the silane coupling agent is greater than 20 mass %, molecules of the silane coupling agent condense, and the desired effects cannot be achieved.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, 3-octanoylthiopropyltriethoxysilane, and the like.

The rubber composition for a tire tread may also contain various compounding agents that are commonly used in rubber compositions for tire treads. Examples thereof include anti-aging agents, plasticizers, processing aids, liquid polymers, terpene resins, thermosetting resins, and the like. These compounding agents can be kneaded by a common method to obtain a rubber composition that can then be used for vulcanization molding. These compounding agents can be compounded at general amounts in the related art so long as the objects of the present technology are not hindered. The rubber composition for a tire tread can be produced by mixing the above-mentioned components using a well-known rubber kneading machine such as a Banbury mixer, a kneader, a roll mill, or the like.

The rubber composition for a tire tread of an embodiment of the present technology can be suitably used for a pneumatic tire for a passenger vehicle, and particularly suitably used for a studless tire. This pneumatic tire for a passenger vehicle in which the rubber composition is used in a tread portion can enhance the balance of the performance on snow during traveling on snow-covered road surfaces and the chipping resistance equal to or beyond levels in the related art.

An embodiment of the present technology is further described below by examples. However, the scope of the present technology is not limited to these examples.

Example

Twenty two types of rubber compositions for tire treads (Standard Example, Examples 1 to 13, and Comparative Examples 1 to 8) were prepared in accordance with the formulations shown in Tables 1 and 2 with the compounding agents shown in Table 3 used as common components. For the preparation, the components except the sulfur and the vulcanization accelerator were weighed and kneaded in a 1.7 L sealed Banbury mixer for 5 minutes. The mixture was then extruded as a master batch and cooled at room temperature. The master batch was fed to the same 1.7 L sealed Banbury mixer, and the sulfur and the vulcanization accelerators were then added to the master batch and mixed to obtain a rubber composition for a tire tread. Note that, in Tables 1 and 2, because the SBR-1 and the SBR-3 to SBR-5 were oil extended products, the net rubber amounts are parallelly shown in parentheses. Furthermore, the net compounded amount (S) of the sulfur was also shown in a parenthesis parallelly. Note that the compounded amounts of the common components of Table 3 are shown as "part by mass" with respect to 100 parts by mass of the diene rubber shown in Tables 1 and 2.

Each of the obtained 22 types of rubber compositions was press-vulcanized in the condition at 150° C. for 30 minutes to produce a test piece (thickness: 12 mm or greater) for evaluation of performance on snow. Furthermore, a pneumatic tire in which each of the 22 types of rubber compositions was used in a cap tread and which had a size (225/60R17) was vulcanization-molded. By using each of the pneumatic tires, the chipping resistance was evaluated by the method described below.

Performance on Snow (Rubber Hardness at −10° C.)

In accordance with JIS K 6253, the rubber hardness of the test piece obtained as described above was measured by using a type A durometer at a temperature of −10° C. The obtained results are shown in Tables 1 and 2 as index values, with the result of Standard Example expressed as an index of 100. A smaller index value, especially an index value of 100 or less, indicates superior performance on snow (steering stability) on snow-covered road surfaces.

Chipping Resistance

The obtained pneumatic tire was mounted on a wheel having a rim size of 17×7J and then mounted on a four-wheel drive vehicle (SUV) with engine displacement of 2000 cc. The vehicle was traveled for 1000 km in the condition of air pressure of 230 kPa, and then traveled for 30 km on unpaved rough road at the speed range of 60 km/hour or less. The chipping resistance was evaluated on the basis of the following judgment criteria based on the appearance of the tread portion after the travel. The evaluations of A and B were acceptable levels.

A: No chipping and no crack occurred
B: A slight crack was observed but no chipping occurred
C: A slight chipping (chipping) occurred
D: A significant chipping (block chipping) occurred

TABLE 1-1

|  |  | Standard Example | Example 1 | Example 2 | Example 3 | Example 4 | Example 5 |
|---|---|---|---|---|---|---|---|
| BR | Parts by mass | 30 | 30 | 10 | 30 | 30 | 30 |
| NR | Parts by mass | 20 | 20 | 40 | 10 | 20 | 20 |
| SBR-1 | Parts by mass |  | 55 | 55 | 55 | 55 | 27.5 |
|  |  |  | (40) | (40) | (40) | (40) | (20) |
| SBR-2 | Parts by mass | 10 | 10 | 10 | 20 |  |  |
| SBR-3 | Parts by mass |  |  |  |  | 12.5 | 37.5 |
|  |  |  |  |  |  | (10) | (30) |
| SBR-4 | Parts by mass | 55 |  |  |  |  |  |
|  |  | (40) |  |  |  |  |  |
| SBR-5 | Parts by mass |  |  |  |  |  |  |
| Carbon black | Parts by mass | 20 | 20 | 20 | 20 | 20 | 20 |
| Silica | Parts by mass | 60 | 60 | 60 | 60 | 60 | 60 |
| Silane coupling agent | Parts by mass | 6.0 | 6.0 | 6.0 | 6.0 | 6.0 | 6.0 |
| Aroma oil | Parts by mass | 9.0 | 9.0 | 9.0 | 9.0 | 6.5 | 9.0 |
| Sulfur (S) | Parts by mass | 2.0 | 2.0 | 2.0 | 2.0 | 2.0 | 2.0 |
|  |  | (1.9) | (1.9) | (1.9) | (1.9) | (1.9) | (1.9) |
| Vulcanization accelerator 1 (A1) | Parts by mass | 2.0 | 2.0 | 2.0 | 2.0 | 2.0 | 2.0 |
| Vulcanization accelerator 2 (A2) | Parts by mass | 0.5 | 0.5 | 0.5 | 0.5 | 0.5 | 0.5 |
| Mass ratio (NR/BR) | (—) | 0.67 | 0.67 | 4.00 | 0.33 | 0.67 | 0.67 |
| Mass ratio [S/(A1 + A2)] | (—) | 0.76 | 0.76 | 0.76 | 0.76 | 0.76 | 0.76 |
| Total amount of fillers | (parts by mass) | 80 | 80 | 80 | 80 | 80 | 80 |
| Proportion of carbon black | (mass %) | 25 | 25 | 25 | 25 | 25 | 25 |
| Total amount of oil components | (parts by mass) | 24.0 | 24.0 | 24.0 | 24.0 | 24.0 | 24.0 |

TABLE 1-1-continued

|  |  | Standard Example | Example 1 | Example 2 | Example 3 | Example 4 | Example 5 |
|---|---|---|---|---|---|---|---|
| Performance on snow | Index value | 100 | 95 | 98 | 96 | 97 | 98 |
| Chipping resistance | Evaluation | B | B | A | B | B | B |

TABLE 1-2

|  |  | Example 6 | Example 7 | Example 8 | Example 9 | Example 10 |
|---|---|---|---|---|---|---|
| BR | Parts by mass | 30 | 30 | 30 | 30 | 30 |
| NR | Parts by mass | 20 | 20 | 20 | 20 | 20 |
| SBR-1 | Parts by mass |  | 55 (40) | 55 (40) | 27.5 (20) | 27.5 (20) |
| SBR-2 | Parts by mass |  | 10 | 10 | 30 | 30 |
| SBR-3 | Parts by mass |  |  |  |  |  |
| SBR-4 | Parts by mass |  |  |  |  |  |
| SBR-5 | Parts by mass | 55 (40) |  |  |  |  |
| Carbon black | Parts by mass | 20 | 20 | 20 | 20 | 20 |
| Silica | Parts by mass | 60 | 60 | 60 | 60 | 60 |
| Silane coupling agent | Parts by mass | 6.0 | 6.0 | 6.0 | 6.0 | 6.0 |
| Aroma oil | Parts by mass | 9.0 | 9.0 | 9.0 | 12.0 | 7.5 |
| Sulfur (S) | Parts by mass | 2.0 (1.9) | 1.8 (1.7) | 1.8 (1.7) | 2.0 (1.9) | 2.0 (1.9) |
| Vulcanization accelerator 1 (A1) | Parts by mass | 2.0 | 2.0 | 1.8 | 2.0 | 2.0 |
| Vulcanization accelerator 2 (A2) | Parts by mass | 0.5 | 0.5 | 0.5 | 0.5 | 0.5 |
| Mass ratio (NR/BR) | (—) | 0.67 | 0.67 | 0.67 | 0.67 | 0.67 |
| Mass ratio [S/(A1 + A2)] | (—) | 0.76 | 0.69 | 0.75 | 0.76 | 0.76 |
| Total amount of fillers | (parts by mass) | 80 | 80 | 80 | 80 | 80 |
| Proportion of carbon black | (mass %) | 25 | 25 | 25 | 25 | 25 |
| Total amount of oil components | (parts by mass) | 24.0 | 24.0 | 24.0 | 19.5 | 15.0 |
| Performance on snow | Index value | 98 | 97 | 97 | 92 | 98 |
| Chipping resistance | Evaluation | B | A | B | B | A |

40

TABLE 2-1

|  |  | Comparative Example 1 | Comparative Example 2 | Comparative Example 3 | Comparative Example 4 | Comparative Example 5 |
|---|---|---|---|---|---|---|
| BR | Parts by mass | 5 | 40 | 30 | 30 | 30 |
| NR | Parts by mass | 45 | 10 | 20 | 20 | 20 |
| SBR-1 | Parts by mass | 55 (40) | 55 (40) | 27.5 (20) | 27.5 (20) | 55 (40) |
| SBR-2 | Parts by mass | 10 | 10 | 30 | 30 | 10 |
| Carbon black | Parts by mass | 20 | 20 | 20 | 20 | 20 |
| Silica | Parts by mass | 60 | 60 | 60 | 60 | 60 |
| Silane coupling agent | Parts by mass | 6.0 | 6.0 | 6.0 | 6.0 | 6.0 |
| Aroma oil | Parts by mass | 9.0 | 9.0 | 6.5 | 18.5 | 9.0 |
| Sulfur (S) | Parts by mass | 2.0 (1.9) | 2.0 (1.9) | 2.0 (1-9) | 2.0 (1-9) | 2.2 (2-1) |
| Vulcanization accelerator 1 (A1) | Parts by mass | 2.0 | 2.0 | 2.0 | 2.0 | 2.0 |
| Vulcanization accelerator 2 (A2) | Parts by mass | 0.5 | 0.5 | 0.5 | 0.5 | 0.5 |

TABLE 2-1-continued

|  |  | Comparative Example 1 | Comparative Example 2 | Comparative Example 3 | Comparative Example 4 | Comparative Example 5 |
|---|---|---|---|---|---|---|
| Mass ratio (NR/BR) | (—) | 9.00 | 0.25 | 0.67 | 0.67 | 0.67 |
| Mass ratio [S/(A1 + A2)] | (—) | 0.76 | 0.76 | 0.76 | 0.76 | 0.84 |
| Total amount of fillers | (parts by mass) | 80 | 80 | 80 | 80 | 80 |
| Proportion of carbon black | (mass %) | 25 | 25 | 25 | 25 | 25 |
| Total amount of oil components | (parts by mass) | 24.0 | 24.0 | 14.0 | 26.0 | 24.0 |
| Performance on snow | Index value | 105 | 93 | 103 | 90 | 97 |
| Chipping resistance | Evaluation | A | D | A | C | C |

TABLE 2-2

|  |  | Comparative Example 6 | Comparative Example 7 | Comparative Example 8 | Example 11 | Example 12 | Example 13 |
|---|---|---|---|---|---|---|---|
| BR | Parts by mass | 30 | 30 | 30 | 30 | 30 | 25 |
| NR | Parts by mass | 20 | 20 | 20 | 20 | 20 | 25 |
| SBR-1 | Parts by mass | 55 (40) | 55 (40) | 55 (40) | 55 (40) | 55 (40) | 55 (40) |
| SBR-2 | Parts by mass | 10 | 10 | 10 | 10 | 10 | 10 |
| Carbon black | Parts by mass | 12 | 20 | 25 | 20 | 25 | 20 |
| Silica | Parts by mass | 68 | 25 | 80 | 70 | 35 | 60 |
| Silane coupling agent | Parts by mass | 6.8 | 2.5 | 8.0 | 7.0 | 3.5 | 6.0 |
| Aroma oil | Parts by mass | 9.0 | 9.0 | 9.0 | 9.0 | 9.0 | 9.0 |
| Sulfur (S) | Parts by mass | 2.0 (1.9) | 2.0 (1.9) | 2.0 (1.9) | 2.0 (1.9) | 2.0 (1.9) | 2.0 (1.9) |
| Vulcanization accelerator 1 (A1) | Parts by mass | 2.0 | 2.0 | 2.0 | 2.0 | 2.0 | 2.0 |
| Vulcanization accelerator 2 (A2) | Parts by mass | 0.5 | 0.5 | 0.5 | 0.5 | 0.5 | 0.5 |
| Mass ratio (NR/BR) | (—) | 0.67 | 0.67 | 0.67 | 0.67 | 0.67 | 1.00 |
| Mass ratio [S/(A1 + A2)] | (—) | 0.76 | 0.76 | 0.76 | 0.76 | 0.76 | 0.76 |
| Total amount of fillers | (parts by mass) | 80 | 45 | 105 | 90 | 60 | 80 |
| Proportion of carbon black | (mass %) | 15 | 44 | 24 | 22 | 42 | 25 |
| Total amount of oil components | (parts by mass) | 24.0 | 24.0 | 24.0 | 24.0 | 24.0 | 24.0 |
| Performance on snow | Index value | 100 | 95 | 105 | 98 | 97 | 98 |
| Chipping resistance | Evaluation | C | C | B | B | B | A |

Note that the types of the raw materials used in Tables 1 and 2 are shown below.

BR: butadiene rubber; UBEPOL BR150, available from Thai Synthetic Rubbers Co., Ltd.

NR: natural rubber, SIR20

SBR-1: emulsion-polymerized styrene-butadiene rubber; NIPOL 9548, available from Zeon Corporation; styrene content: 37 mass %; an oil extended product containing 37.5 parts by mass of oil SBR-2: emulsion-polymerized styrene-butadiene rubber; NIPOL 1502, available from Zeon Corporation; styrene content: 24 mass %; not an oil extended product SBR-3: solution-polymerized styrene-butadiene rubber; TUFDENE F3420, available from Asahi Kasei Corporation; styrene content: 36 mass %; an oil extended product containing 25 parts by mass of oil SBR-4: emulsion-polymerized styrene-butadiene rubber; NIPOL 1739, available from Zeon Corporation; styrene content: 40 mass %; an oil extended product containing 37.5 parts by mass of oil SBR-5: solution-polymerized styrene-butadiene rubber; JSR HP755R, available from JSR Corporation; styrene content: 40 mass %; an oil extended product containing 37.5 parts by mass of oil Carbon black: N-134, available from Thai Tokai Carbon Product Company Limited; nitrogen adsorption specific surface area ($N_2SA$): 141 $m^2/g$ Silica: ULTRASIL 7000GR, available from Evonik; CTAB specific surface area: 158 $m^2/g$ Silane coupling agent: Si69, available from Evonik Degussa; bis(3-(triethoxysilyl)propyl) tetrasulfide Aroma oil: VIVATEC 500, available from H&R Chemical Sulfur: Golden Flower oil treated sulfur powder, available from Tsurumi Chemical Industry Co., Ltd. (sulfur content: 95.24 mass %)

Vulcanization Accelerator 1: Vulcanization accelerator CBS; NOCCELER CZ-G, available from Ouchi Shinko Chemical Industrial Co., Ltd.

Vulcanization Accelerator 2: Vulcanization accelerator DPG; NOCCELER D-G, available from Ouchi Shinko Chemical Industrial Co., Ltd.

TABLE 3

| Common formulation of rubber composition | |
| --- | --- |
| Zinc oxide | 3.0 parts by mass |
| Stearic acid | 1.0 part by mass |
| Anti-aging agent 1 | 1.5 parts by mass |
| Anti-aging agent 2 | 1.5 parts by mass |

The types of raw materials used in Table 3 are described below.

Zinc oxide: Zinc Oxide III, available from Seido Chemical Industry Co., Ltd.

Stearic acid: beads stearic acid, available from NOF Corporation

Anti-aging agent 1: Santoflex 6PPD, available from Solutia Europe

Anti-aging agent 2: PILNOX TDQ, available from Nocil Limited

As is clear from Tables 1 and 2, the rubber compositions for tire treads of Standard Example and Examples 1 to 13 can enhance the balance of the performance on snow and the chipping resistance equal to or beyond the level of the Standard Example.

The rubber composition of Comparative Example 1 is inferior in performance on snow because the compounded amount of the butadiene rubber is less than 10 mass %.

The rubber composition of Comparative Example 2 is inferior in chipping resistance because the compounded amount of the butadiene rubber is greater than 30 mass %.

The rubber composition of Comparative Example 3 is inferior in performance on snow because the total amount of the oil components is less than 15 parts by mass.

The rubber composition of Comparative Example 4 is inferior in chipping resistance because the total amount of the oil components is greater than 25 parts by mass.

The rubber composition of Comparative Example 5 is inferior in chipping resistance because the mass ratio of the sulfur to the vulcanization accelerator (S/A) is greater than 0.8.

The rubber composition of Comparative Example 6 is inferior in chipping resistance because the mass proportion of the carbon black in the fillers is less than 20 mass %.

The rubber composition of Comparative Example 7 is inferior in chipping resistance because the compounded amount of the filler is less than 50 parts by mass.

The rubber composition of Comparative Example 8 is inferior in performance on snow because the compounded amount of the filler is greater than 100 parts by mass.

The invention claimed is:

1. A rubber composition for a tire tread comprising:
per 100 parts by mass of a diene rubber containing a natural rubber, from 30 to 87 mass % of a styrene-butadiene rubber and from 10 to 30 mass % of a butadiene rubber, from 50 to 100 parts by mass of a filler containing not less than 20 mass % of carbon black having a nitrogen specific surface area of from 130 to 180 $m^2/g$, the rubber composition comprising not more than 25 parts by mass of the carbon black per 100 parts by mass of the diene rubber;
S parts by mass of sulfur;
A parts by mass of a vulcanization accelerator; and oil,
a mass ratio of the natural rubber to the butadiene rubber (NR/BR) being 0.3 or greater and 2.5 or less, a compounded ratio of the sulfur to the vulcanization accelerator (S/A) being 0.8 or less, and a total amount of an oil component in the rubber composition containing the oil being from 15 to 25 parts by mass, and
the styrene-butadiene rubber being an emulsion-polymerized styrene-butadiene rubber and/or a solution-polymerized styrene-butadiene rubber having a styrene content of less than 40 mass %;
wherein the styrene-butadiene rubber comprises two different styrene-butadiene rubbers.

2. A pneumatic tire for a passenger vehicle comprising the rubber composition for a tire tread described in claim 1.

* * * * *